(12) United States Patent
Fan et al.

(10) Patent No.: US 11,292,500 B2
(45) Date of Patent: Apr. 5, 2022

(54) ACCOMMODATION DEVICE FOR STROLLER AND STROLLER HAVING THE SAME

(71) Applicant: Shanghai Dorel Juvenile Co., Ltd., Shanghai (CN)

(72) Inventors: Mingfeng Fan, Guangdong (CN); Dequan Zhang, Guangdong (CN); Shoubin Hu, Guangdong (CN)

(73) Assignee: Shanghai Dorel Juvenile Co., Ltd., Shanghai (CN)

( * ) Notice: Subject to any disclaimer, the term of this patent is extended or adjusted under 35 U.S.C. 154(b) by 0 days.

(21) Appl. No.: 16/963,244

(22) PCT Filed: Jan. 10, 2019

(86) PCT No.: PCT/CN2019/071125
§ 371 (c)(1),
(2) Date: Jul. 19, 2020

(87) PCT Pub. No.: WO2019/141127
PCT Pub. Date: Jul. 25, 2019

(65) Prior Publication Data
US 2021/0362765 A1 Nov. 25, 2021

(30) Foreign Application Priority Data

Jan. 19, 2018 (CN) .......................... 201820093007.6
Dec. 27, 2018 (CN) .......................... 201822228639.1

(51) Int. Cl.
*B62B 7/14* (2006.01)
*B62B 9/12* (2006.01)
*B62B 7/08* (2006.01)

(52) U.S. Cl.
CPC .............. *B62B 7/145* (2013.01); *B62B 7/08* (2013.01); *B62B 7/142* (2013.01); *B62B 7/147* (2013.01); *B62B 9/12* (2013.01)

(58) Field of Classification Search
CPC .................................. B62B 7/147; B62B 9/12
See application file for complete search history.

(56) References Cited

U.S. PATENT DOCUMENTS 3,330,575 A * 7/1967 Boudreau ................. B62B 9/26
280/648
4,072,318 A * 2/1978 Laune ..................... B62B 7/147
280/42

(Continued)

FOREIGN PATENT DOCUMENTS

| CN | 102273854 | 12/2011 |
| CN | 203172688 | 9/2013 |

(Continued)

OTHER PUBLICATIONS

"International Search Report (Form PCT/ISA/210) of PCT/CN2019/071125", dated Apr. 10, 2019, with English translation thereof, pp. 1-6.

*Primary Examiner* — Erez Gurari
(74) *Attorney, Agent, or Firm* — JCIP Global Inc.

(57) ABSTRACT

An accommodation device includes a seat assembly, at least one flexible adjustment strap and an accommodating cavity having a bearing portion and a flexible circumferential surrounding portion. The accommodating cavity is rotatable between a lying state and a sitting state. When in the sitting state, a side of the circumferential surrounding portion reaching a topmost point is a first side portion, and a side opposite to the first side portion is a second side portion. The bearing portion has at least two foldable portions forming a first portion close to the first side portion and a second portion far from the first side portion. The adjusting strap is (Continued)

tensioned by the seat assembly and the first side portion when in the sitting state. The second portion is moved to form a seat portion during rotation to the sitting state, and the first portion is supported by the adjusting strap to form a backrest portion.

16 Claims, 17 Drawing Sheets

(56) References Cited

U.S. PATENT DOCUMENTS

| | | | | |
|---|---|---|---|---|
| 4,597,116 A * | 7/1986 | Kassai | ............... | B62B 9/104 5/99.1 |
| 4,836,573 A * | 6/1989 | Gebhard | ............... | B62B 7/147 280/47.38 |
| 5,375,869 A * | 12/1994 | Hsiao | ............... | A47D 1/06 280/648 |
| 5,388,852 A * | 2/1995 | Bigo | ............... | B62B 7/08 280/42 |
| 6,286,844 B1 * | 9/2001 | Cone, II | ............... | B62B 9/28 280/47.41 |
| 7,367,581 B2 * | 5/2008 | Yang | ............... | B62B 7/14 280/642 |
| 8,657,326 B2 * | 2/2014 | Shaanan | ............... | B62B 9/108 280/644 |
| 9,610,966 B2 * | 4/2017 | Zhong | ............... | A47D 11/005 |
| 10,913,480 B2 * | 2/2021 | Gu | ............... | B62B 9/102 |
| 2012/0187660 A1 | 7/2012 | Liao | | |
| 2014/0183843 A1 * | 7/2014 | Iftinca | ............... | B62B 9/104 280/647 |
| 2014/0319884 A1 * | 10/2014 | Doucette | ............... | B62B 7/00 297/118 |
| 2016/0101802 A1 * | 4/2016 | Zhong | ............... | A47D 9/00 280/47.4 |
| 2016/0128491 A1 * | 5/2016 | Martiniuk | ............... | B62B 9/24 280/47.41 |
| 2020/0331510 A1 * | 10/2020 | Kim | ............... | A47D 15/00 |

FOREIGN PATENT DOCUMENTS

| | | |
|---|---|---|
| CN | 203318477 | 12/2013 |
| CN | 206086840 | 4/2017 |
| CN | 107161202 | 9/2017 |
| CN | 206719297 | 12/2017 |
| CN | 208211827 | 12/2018 |

* cited by examiner

ACCOMMODATION DEVICE FOR STROLLER AND STROLLER HAVING THE SAME

CROSS-REFERENCE TO RELATED APPLICATION

This application is a 371 of international application of PCT application serial no. PCT/CN2019/071125, filed on Jan. 10, 2019, which claims the priority benefit of China application no. 201820093007.6, filed on Jan. 19, 2018 and China application no. 201822228639.1, filed on Dec. 27, 2018. The entirety of each of the above mentioned patent applications is hereby incorporated by reference herein and made a part of this specification.

BACKGROUND OF THE INVENTION

Field of the Invention

The invention relates to a baby stroller, in particular to an accommodation device having a simple structure and low cost that may be converted between a plurality of states via a simple operation. The invention also relates to a stroller having the accommodation device.

Description of Related Art

In most of the existing strollers for an infant or child, the accommodation device may be adjusted as needed to help the infant or child to sit or lie down. Specific technical solutions include the following.

In a first type, as shown in FIGS. 1a to 1b, when the accommodation device is in a sitting state, the upper portion of a backrest 3 formed to support a back of an infant or child is only lifted by a corresponding flexible fabric 32, and the flexible fabric 32, under the weight of the backrest 3, is fully stretched to the original width thereof due to a lack of support (the width here is the height of the flexible fabric 32 shown in FIG. 1a when the accommodation device is in a lying state), and is even stretched wider, thereby causing the angle of inclination formed by the backrest 3 and the vertical plane to be too large. When the infant or child is seated in the accommodation device in this state, a semi-lying posture is in actuality achieved, rather than a fully sitting state; and since the flexible fabric 32 is readily shaken in a sitting state, discomfort to the infant or child readily occurs.

In a second type, as shown in FIG. 2, when the accommodation device is in a sitting state, a backrest 48 formed to support the back of an infant or child is bound by an additional strap 49. Although this solution overcomes the defects of the first solution that the backrest is too tilted and/or easily shaken when sitting, it also has the issue of complicated operation. For example, after the accommodation device is adjusted from the lying state to the sitting state, a user needs to manually tighten the straps to keep the accommodation device in a firm sitting position. Conversely, when the accommodation device is adjusted from the sitting state to the lying state, the user needs to first manually untie the straps, and then rotate the accommodation device to the lying state.

In a third type, as shown in FIG. 3, the backrest 3 used to form a sitting state in the accommodation device needs to be made of a rigid material or a hard material that may bear at least a certain weight (such as the average weight of an infant or child), and the backrest 3 and the frame 2 are hinged by a supporting member 4 made of a rigid material. During the adjustment of the accommodation device from the lying state to the sitting state, the two ends of the supporting member 4 are adapted to be rotated relative to the backrest 3 and the frame 2 respectively, and in the sitting state, the backrest 3 is kept at a smaller angle of inclination (the angle of inclination here is the angle formed by the backrest 3 and the vertical plane). Although this kind of accommodation device may achieve the conversion of the accommodation device from the lying state to the sitting state via a single operation, in order to ensure that the supporting member 4 and the backrest 3 are sufficiently tightened to withstand the weight from the infant or child in the sitting state (otherwise, the backrest 3 is rotated with the supporting member 4 by the action of the infant or child, and lastly forms a half-lying state of the first type of accommodation device above). However, this larger tightening force between the supporting member 4 and the backrest 3 needs to be overcome by the user by applying a very large force when the state of the accommodation device is converted, thereby causing difficulty in adjusting the accommodation device.

SUMMARY OF THE INVENTION

The first object of the invention is to provide an accommodation device adapted for a stroller. The accommodation device is simple in structure, low in cost, and may be converted in different states by a simple operation.

The first object of the invention is achieved by the following technical solution. An accommodation device adapted for a stroller includes a seat assembly and an accommodating cavity. The accommodating cavity includes a bearing portion and a flexible circumferential surrounding portion having upper and lower ends that are both open ports. A lower open port of the circumferential surrounding portion is covered by the bearing portion, and an upper open port forms an opening of the accommodating cavity communicating with outside. The accommodating cavity is rotatable relative to the seat assembly on a vertical plane to be converted between a lying state and a sitting state, when the accommodating cavity is rotated to the sitting state, a side of the circumferential surrounding portion reaching a topmost point is a first side portion of the circumferential surrounding portion, and a side of the circumferential surrounding portion opposite to the first side portion is a second side portion of the circumferential surrounding portion. The bearing portion is movably disposed on the seat assembly, and at least two portions of the bearing portion are foldable in a lateral direction to form a first portion relatively close to the first side portion and a second portion relatively far from the first side portion. The accommodation device further includes at least one flexible adjusting strap. A first end of the adjusting strap is connected to the seat assembly, a second end of the adjusting strap is fixed to an opening of the first side portion, and the adjusting strap is tensioned by the seat assembly 3 and the first side portion when the accommodating cavity is in the sitting state. The second portion is moved to a position supported by the seat assembly to form a seat portion during rotation of the accommodation cavity from the lying state to the sitting state, and the first portion is supported by the tensioned adjusting strap when the accommodating cavity is rotated to the sitting state to form a backrest portion at a folding angle to the second portion.

When an end of the adjusting strap connected to the seat assembly is fixedly connected, the accommodation device has the two states, which are the lying state and the sitting state. At this time, in the invention, a frame is provided around a periphery of the opening of the accommodating cavity, the frame includes a front frame body and a rear frame body forming a hinge connection, and the front frame body and the rear frame body are substantially arranged in a straight line when in the sitting state and the lying state. When using the accommodation device, the accommodation device is mounted on the chassis of the stroller in a manner that the seat assembly thereof is fixed relative to the chassis of the stroller. When the accommodation device needs to be converted from the lying state to the sitting state, a user only needs to gradually lift the first side portion of the circumferential surrounding portion of the accommodating cavity of the accommodation device to rotate relative to the seat assembly on a vertical plane. During the lifting process, an angle of the accommodating cavity relative to the seat assembly is gradually changed, so that the bearing portion of the accommodating cavity is pulled and adaptively moved relative to the seat assembly. At the same time, a distance between the first side portion of the circumferential surrounding portion of the accommodating cavity and the seat assembly is also gradually increased, so that the flexible adjusting strap is gradually tensioned into a straight line. When the accommodating cavity reaches the sitting state, the second portion of the bearing portion is located just above the seat assembly and is supported by the seat assembly to form a seat portion for an infant or child. At the same time, the flexible adjusting strap is in a fully tensioned state, and since both ends of the adjusting strap are respectively fixed at the seat assembly and the opening of the first side portion of the circumferential surrounding portion of the accommodating cavity (below the opening is referred to as a top connection point), the adjusting strap being tensioned may automatically support the first portion of the bearing portion at a position of a connecting line connected at the seat assembly and the top connection point, so as to form a backrest portion having a smaller folding angle (i.e., the angle of inclination with the vertical plane is smaller) at the second portion. When the accommodation device needs to be converted from the sitting state to the lying state, the user only needs to gradually press the first side portion of the circumferential surrounding portion of the accommodation device to rotate relative to the seat assembly on a vertical plane. During the pressing process, the distance between the first side portion of the circumferential surrounding portion of the accommodation device and the seat assembly is gradually decreased to return to a relaxed state. At this time, the bearing portion of the accommodation device without support sags under its own gravity, and automatically returns to the lying state held by the circumferential surrounding portion.

The accommodation device provided by the invention adopts an adjusting strap to realize the function of conversion between the lying state and the sitting state, does not require other auxiliary structures and operations, and has a simple structure, is compact, and manufacturable. In the process of conversion between the sitting state and the lying state, when the bearing portion of the accommodating cavity of the accommodation device is still held by the flexible circumferential surrounding portion while moving on the seating assembly, shaking is more or less generated. When the user uses too much force to lift the accommodation device, the bearing portion of the accommodating cavity may be lifted away from the seat assembly. In order to reduce such shaking and/or deviation as much as possible, on the basis of the above, the invention may provide the following improvements. A bottom surface of the second portion of the bearing portion of the accommodating cavity is provided with a guide sleeve disposed in a longitudinal direction, and the guide sleeve covers the seat assembly and is movable relative to the seat assembly in the longitudinal direction. In the present preferred embodiment, the guide sleeve provided longitudinally may limit the movement of the accommodating cavity of the accommodation device relative to the seat assembly to a smooth sliding in the longitudinal direction close to the surface of the seat assembly.

When an end of the adjusting strap connected to the seat assembly is connected to the seat assembly in a longitudinally movable manner along the seat assembly, the accommodation device is further provided with a collapsing function on the basis of having the two states of lying and sitting. At this point, the invention may provide the following improvements. The frame is provided around a periphery of the opening of the accommodating cavity, the frame includes the front frame body and the rear frame body forming a hinged connection, the front frame body and the rear frame body are substantially arranged in a straight line when in the sitting state and the lying state, the first end of the adjusting strap is movable along the seat assembly away from or close to the second end of the adjusting strap, and the front frame body and the rear frame body pull the adjusting strap to be moved in a direction close to the second end thereof when the front frame body and the rear frame body are collapsed to a stacked state from a substantially linear state.

When the accommodation device needs to be converted from the sitting state to a collapsed state, the seat assembly is kept stationary. The accommodating cavity only needs to be collapsed on the vertical plane, and the accommodating cavity 1 pulls the adjusting strap during the collapsing process. Since the adjusting strap is connected to the seat assembly in a longitudinally slidable manner along the seat assembly, the adjusting strap is movable relative to the seat assembly when the accommodating cavity is in the collapsed state. In the invention, a length of the adjusting strap is strictly limited, and unlike the elastic strap that stretches and deforms under the action of an external force, the length of the adjusting strap of the invention is unchanged under the action of an external force. The length of the adjusting strap itself is strictly designed according to the lying state and the sitting state of the accommodation device, so if the adjusting strap cannot slide relative to the seat assembly, the length of the adjusting strap may not meet the length requirement of the accommodation device when folded. The adjusting strap of the invention may slide relative to the seat assembly when the accommodating cavity is in the collapsed state, which is equivalent to seemingly increasing the length of the adjusting strap, so that when the length of the adjusting strap itself unchanged, the requirement of collapsing the accommodating cavity is met by moving relative to the seat assembly. That is, the adjusting strap not only satisfies the conversion between the sitting state and lying state of the accommodation device, but also provides a collapsing function to the accommodation device on the basis of sitting and lying.

In the invention, an end of the adjusting strap connected to the seat assembly is connected to a tension spring via a seat sliding block. The seat sliding block is sleeved on the seat assembly and is slidable longitudinally along the seat assembly, and the tension spring is respectively connected to the seat sliding block and the seat assembly to provide a restoring force when the seat sliding block is reset. The end of the adjusting strap connected to the seat assembly is connected by a sliding connection unit without changing the overall structure of the accommodation device or changing the original configuration method of the adjusting strap, and the object that the adjusting strap may satisfy the collapse of the accommodating cavity may be achieved via a simple adjustment of the connection structure at an end of the adjusting strap. In the invention, in the process of conversion between the sitting state and the lying state, in order to minimize such shaking and/or deviation, the invention may provide the following improvements. A bottom surface of the second portion of the bearing portion of the accommodating cavity is provided with a guide sleeve disposed in a longitudinal direction, the guide sleeve is sleeved on the seat assembly and may is movable relative to the seat assembly in the longitudinal direction, and the guide sleeve surrounds and covers the seat sliding block and the tension spring. In the present preferred embodiment, the guide sleeve provided longitudinally may limit the movement of the accommodating cavity of the accommodation device relative to the seat assembly to a smooth sliding in the longitudinal direction close to the surface of the seat assembly.

In the invention, the specific connection relationship of the adjusting strap, the seat assembly, and the guide sleeve adopts the following structure. The seat assembly has a seat bottom tube and a seat upper tube connected to each other, the seat bottom tube is a U-shaped tube, the seat upper tube is fixedly connected to an open end of the U-shaped tube, both ends of the seat sliding block are sleeved on side tubes on both sides of the U-shaped tube, an end of the tension spring is fixedly connected to the seat sliding block, and the other end of the tension spring is fixedly connected to a bottom tube at a bottom part of the U-shaped tube, the seat sliding block is movable longitudinally along the seat bottom tube under an action of an external force, and after the external force is eliminated, the seat sliding block is reset via the tension spring, and the guide sleeve surrounds and covers the seat bottom tube and is movable longitudinally along the seat bottom tube. The guide sleeve surrounds and covers the seat bottom tube and the seat sliding block, so that the guide sleeve and the seat sliding block do not interfere with each other when each is moving longitudinally along the seat bottom tube, and do not affect each other. In particular, the guide sleeve is preferably a flexible guide sleeve.

In order to facilitate the assembly of the tension spring and the U-shaped tube, the invention may provide the following improvements. The other end of the tension spring connected to the bottom tube at the bottom part of the U-shaped tube has a tension spring fixing seat. The tension spring fixing seat has pliers and is directly clamped on the U-shaped tube via the pliers during assembly to facilitate assembly.

On the basis above, the invention may provide the following improvements. The seat upper tube is further provided with an adjusting strap sleeve at a position intersected with the seat bottom tube, the adjusting strap sleeve is provided with a through hole for the adjusting strap passing therethrough, and the adjusting strap sleeve makes the adjusting strap always be in frictional contact with the seat bottom tube during sliding of the adjusting strap. The additional adjusting strap sleeve may be supported by a suitable material different from the U-shaped tube, such as a plastic material, to minimize the wear of the adjusting strap. At the same time, the arrangement position of the adjusting belt sleeve is close to the tension spring to ensure that the stretching direction of the adjusting strap to the tension spring coincides with an axis of the tension spring itself when the accommodation device is collapsed to prevent tension deviation.

On the basis above, the invention may provide the following improvements. The bearing portion and/or the circumferential surrounding portion of the accommodating cavity is one layer or more than one layer, the adjusting strap is located outside an innermost layer of the bearing portion and/or the circumferential surrounding portion, and when the accommodating cavity is in the lying state, the adjusting strap is closely adhered to an outer surface of the innermost layer of the bearing portion and/or the circumferential surrounding portion, or is closely adhered to an outer surface of any layer outside the innermost layer. In a preferred embodiment, when the bearing portion and/or the circumferential surrounding portion are one layer, the adjusting strap is closely adhered to the outer surface of the bearing portion and/or the circumferential surrounding portion when the accommodating cavity is in the lying state. Such a configuration enables the adjusting strap to not only support the first portion of the bearing portion from the rear when the accommodating cavity is in a sitting state, but also allows the adjusting strap to have a suitable length so as not to hang down from being too long when the accommodating cavity is in the lying state. When the bearing portion and/or the circumferential surrounding portion is more than one layer, it is better to pass the adjusting strap between the plurality of layers of the bearing portion and/or the circumferential surrounding portion. At this time, the multi-layer bearing portion and/or circumferential surrounding portion respectively form a guiding effect similar to the above "guide sleeve", so that the mutual movement between the first portion of the bearing portion and the adjusting strap is as smooth as possible, and the structure of the accommodating cavity is more compact and tidy.

To make the infant or child more comfortable when lying, on the basis of the above, the invention may further provide the following improvements. The bearing portion of the accommodating cavity includes a multi-layer outer sleeve that is flexible, at least two rigid plates that are foldable between each other are wrapped in the multi-layer outer sleeve, and the rigid plates relatively close to the first side portion form the first portion and the rigid plates relatively far from the first side portion form the second portion. The rigid first portion and second portion adopted in a preferred embodiment allow the bearing portion of the accommodating cavity in the lying state to have sufficient strength to support the infant or child in a more lying posture, so as to avoid discomfort to the infant or child due to the depression of the back.

On the basis above, the invention may provide the following improvements. A third portion formed by a rigid plate is also wrapped in the multi-layer outer sleeve of the bearing portion, wherein the third portion is located between the second portion and the second side portion and is foldable with the second portion in a lateral direction, and a lateral dimension of the second portion matches a lateral dimension of the seat assembly. When the user converts the accommodating cavity of a preferred embodiment from the lying state to the sitting state, the second side portion is rotated downward and pulls the third portion downward. At the same time, the first side portion is rotated upward and pulls the second portion laterally, so that a folding angle is formed between the second portion and the third portion and the folding angle matches the seat assembly when the accommodating cavity is converted into the sitting state, thereby achieving that in the sitting state, the second portion is located just above the seat assembly, and a space for accommodating the feet of the infant or child is formed between the third portion and the second side portion.

On the basis above, the invention may further provide the following improvements. The second portion and the third portion are separate bodies, and the second portion and the first portion are integrally connected by a hinge. The second portion and the first portion of the present preferred embodiment are integrally connected, and may in particular ensure that after the accommodating cavity is converted from the lying state to the sitting state, the backrest portion formed by the first portion and the seat portion formed by the second portion are always tightly connected to prevent a larger gap from appearing due to unsynchronized displacement when the first portion and the second portion are moved relative to the adjusting strap. When the second portion and the third portion 113 are split, a gap may be formed between the two when converting from the lying state to the sitting state. When the second portion and the third portion form a folding angle during the conversion from the lying state to the sitting state, the gap between the two is only connected by an outer sleeve, and the outer sleeve may be better adhered to the seat assembly, so that the second portion may be positioned above the seat assembly in the sitting state.

On the basis above, the invention may provide the following improvements. The rigid frame is provided around the opening of the accommodating cavity, the frame is hinged with the seat assembly, and the accommodating cavity is rotatably connected to the seat assembly via the frame to achieve the conversion of the accommodation device between the three states of lying, sitting, and collapsing. In a preferred embodiment, the rigid frame may ensure that the opening of the accommodating cavity remains undeformed and facilitate the mounting of the accommodating cavity and the seat assembly. Generally, the frame is a split structure, including the front frame body and the rear frame body, and the front frame body and the rear frame body are both hinged with the seat assembly 3 via a clamp assembly.

On the basis of the above, the invention further includes a locking device. The locking device is disposed on the frame, at least three locking positions are provided between the locking device and the frame, a first locking position corresponds to a position when the frame is rotated to the sitting state, a second locking position corresponds to a position when the frame is rotated to the lying state, and a third locking position corresponds to a position when the frame is rotated to a collapsed state, to ensure the reliability of the accommodation device in the corresponding state.

On the basis of the above, the invention may provide the following improvements. There is one adjusting strap, and the adjusting strap is located on a longitudinal axis of the accommodating cavity. The weight of an infant or child is relatively light, and the provision of an adjusting strap made of a suitable material may ensure the reliability of the conversion between the lying state and the sitting state of the accommodation device while reducing processing as much as possible.

Compared with an embodiment in which only one adjusting strap is provided, on the basis of the above, the invention may further provide the following improvements. There are two adjusting straps, and the two adjusting straps are symmetrically arranged with the longitudinal axis of the accommodating cavity as a center. In the present embodiment, two adjusting straps are provided to better balance the force from the infant and child on the second portion.

Based on the above, the adjusting straps of the invention are woven straps.

The second object of the invention is to provide a stroller having an accommodation device having a simple structure, low cost, and capable of converting between different states by a simple operation.

The second object of the invention may be achieved by the following technical solution. A stroller includes a chassis with a wheel assembly, and further includes the accommodation device. The seat assembly of the accommodation device is fixedly mounted on the chassis, and the wheel assembly is fixedly mounted at a bottom portion of the chassis to support the entire stroller.

DESCRIPTION OF THE EMBODIMENTS

Embodiment 1

Figure 1A:
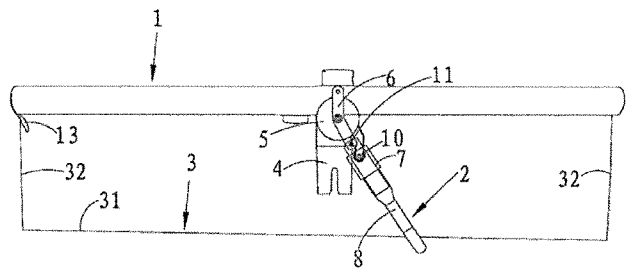
FIG. 1a to FIG. 1b are structural diagrams of a conventional stroller, wherein the accommodation device in FIG. 1a is in a lying state, and the accommodation device in FIG. 1b is in a sitting state.
Figure 1B:
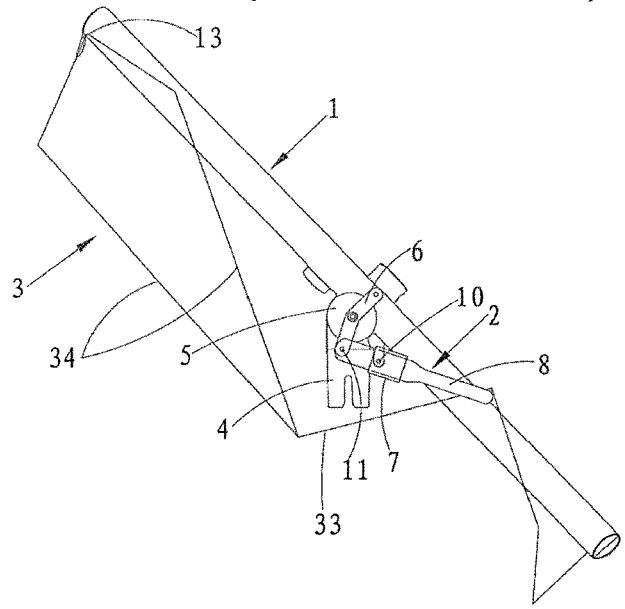
Figure 2:
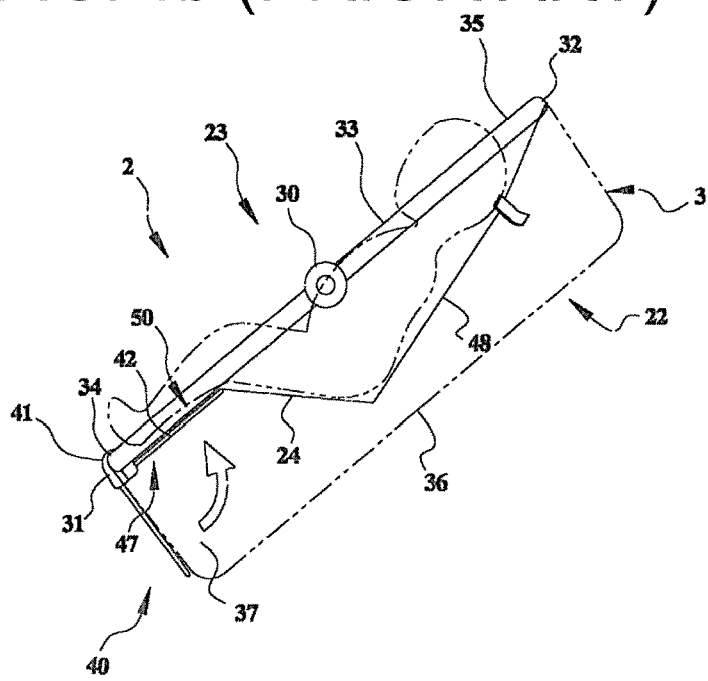
FIG. 2 is a structural diagram of another conventional stroller, wherein an accommodation device is in a sitting state.
Figure 3:
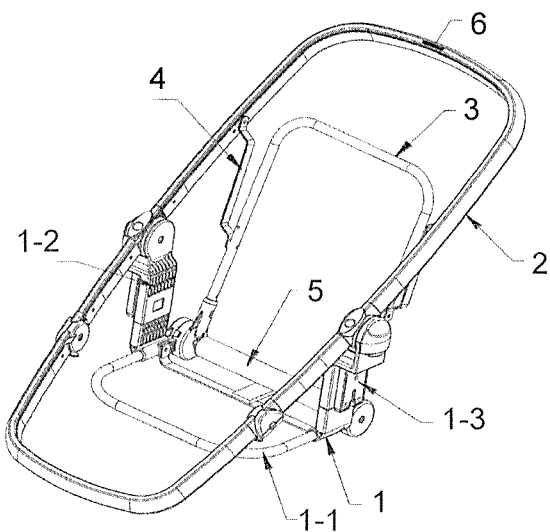
FIG. 3 is a structural diagram of a third type of conventional stroller, wherein an accommodation device is in a sitting state.
Figure 4:
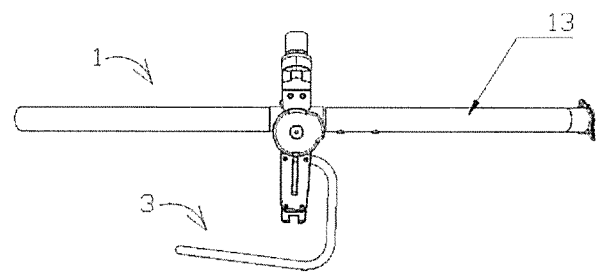
FIG. 4 is a diagram of a connection structure of a frame and a seat assembly of an accommodation device in a lying state of Embodiment 1 of the invention, wherein a guardrail is disposed on the frame.
Figure 5:
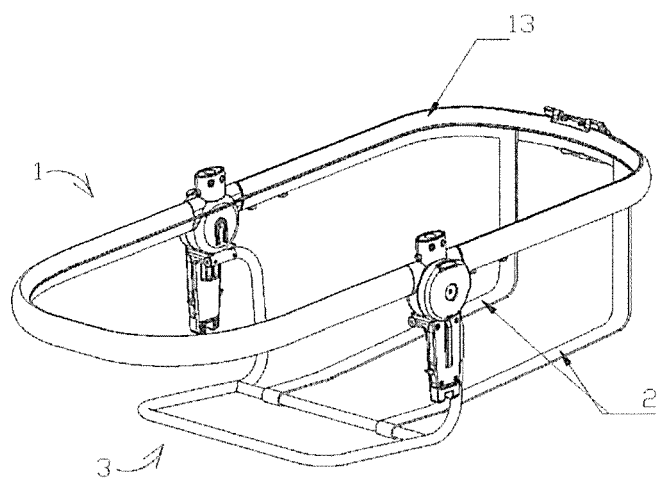
FIG. 5 is a diagram of a connection structure of the frame, the seat assembly, and an adjusting strap of an accommodation device in the lying state of Embodiment 1 of the invention.
Figure 6:
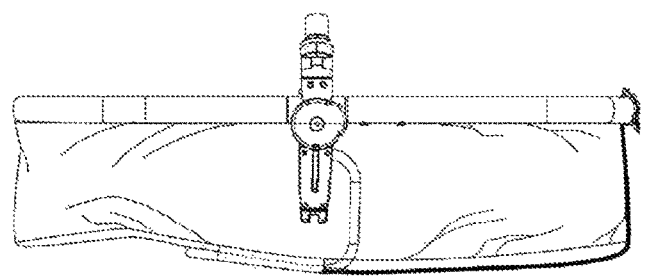
FIG. 6 is a structural diagram of an accommodation device in the lying state of Embodiment 1 of the invention, wherein the guardrail is disposed on the frame.
Figure 7:
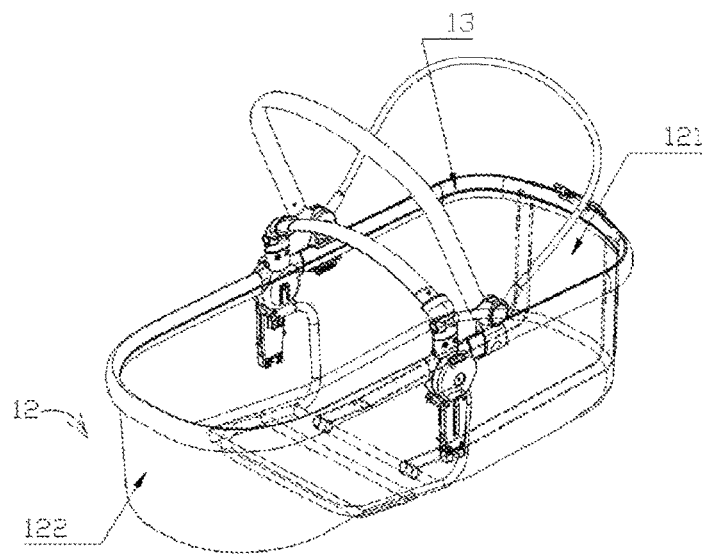
FIG. 7 is a structural diagram of an accommodation device in the lying state of Embodiment 1 of the invention, wherein the guardrail and a canopy are disposed on the frame.
Figure 8:
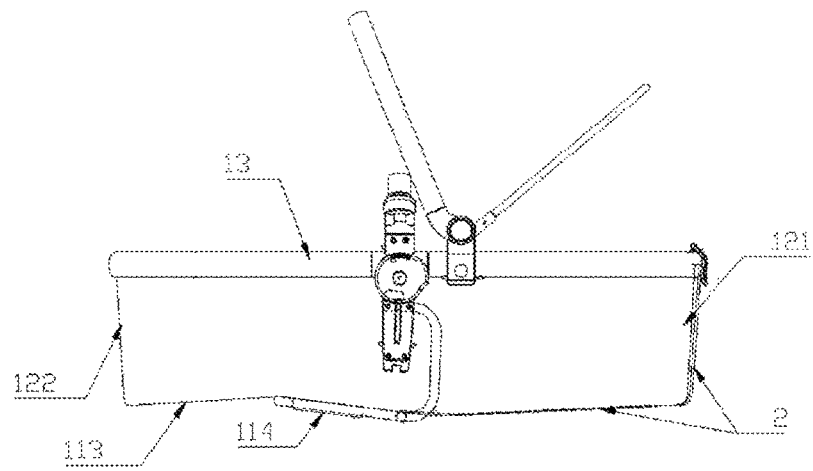
FIG. 8 is a front view of FIG. 7.
Figure 9:
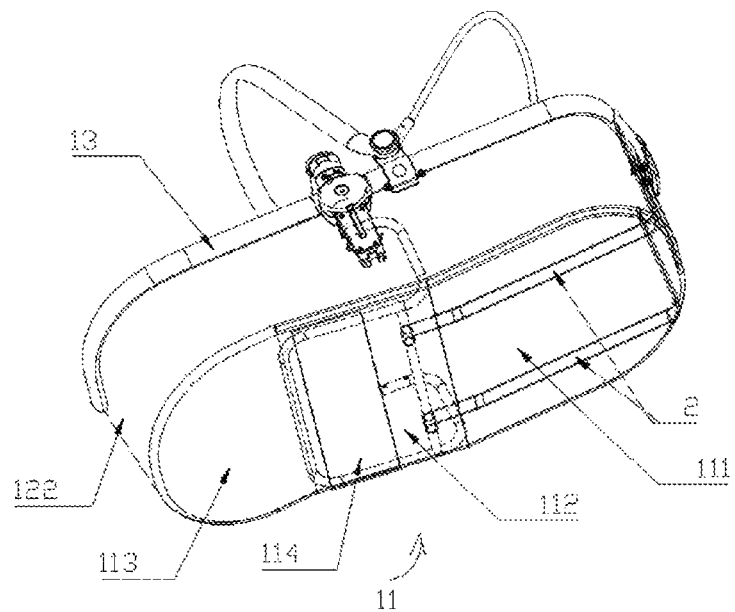
FIG. 9 is a structural diagram of a bottom part of FIG. 7.
Figure 10:
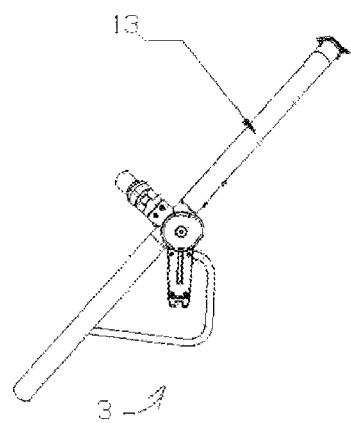
FIG. 10 is a diagram of a connection structure of the frame and the seat assembly of an accommodation device in a sitting state of Embodiment 1 of the invention, wherein the guardrail is disposed on the frame.
Figure 11:
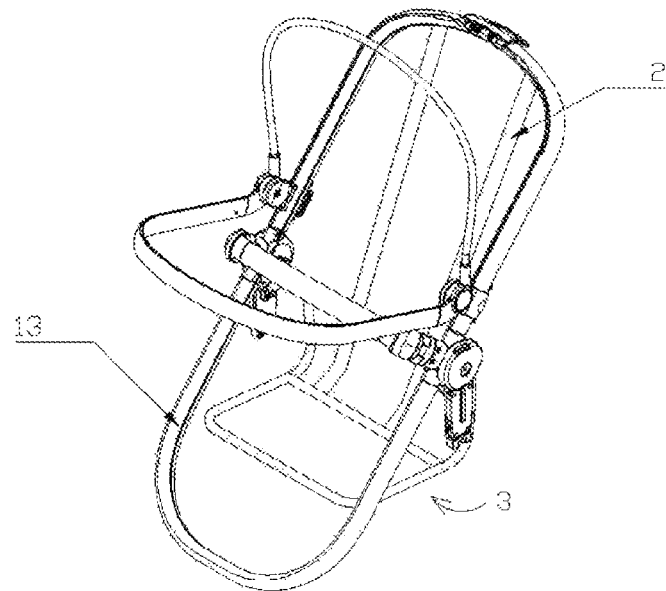
FIG. 11 is a diagram of a connection structure of the frame, the seat assembly, and the adjusting strap of an accommodation device in a sitting state of Embodiment 1 of the invention, wherein the guardrail and the canopy are disposed on the frame.
Figure 12:
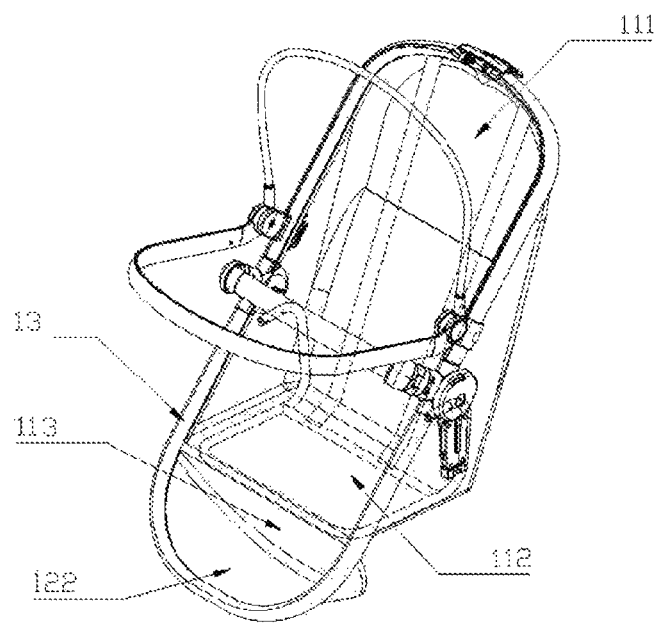
FIG. 12 is a structural diagram of an accommodation device in the sitting state of Embodiment 1 of the invention, wherein the guardrail and the canopy are disposed on a frame, and a folded state of a first side portion of a circumferential surrounding portion is omitted.
Figure 13:
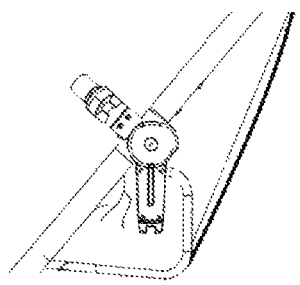
FIG. 13 is a structural diagram of an accommodation device in the sitting state of Embodiment 1 of the invention, wherein the guardrail is disposed on the frame, and the first side portion of the circumferential surrounding portion is shown in the folded state.

Embodiment 1 of an accommodation device of the invention is shown in FIG. 4 to FIG. 13 and includes an accommodating cavity 1, a seat assembly 3, a locking device, and two adjusting straps 2. The adjusting straps 2 are woven straps, and the accommodating cavity 1 may be rotated relative to the seat assembly 3 on a vertical plane to convert between a lying state and a sitting state. The directions described in the present specification all take a direction of a rotation axis of the accommodating cavity 1 as a lateral direction and the direction of the rotation axis perpendicular to the accommodating cavity 1 as a longitudinal direction.

In particular, the accommodating cavity 1 includes a bearing portion 11 and a flexible circumferential surrounding portion 12 having two opposite ends that are open ports. A lower open port of the circumferential surrounding portion 12 is fixedly covered by the bearing portion 11, and an upper open port forms an opening of the accommodating cavity 1 communicating with outside. A rigid frame 13 is provided around a periphery of the opening of the accommodating cavity 1, and the accommodating cavity 1 is rotatably connected to the seat assembly 3 via the frame 13.

The circumferential surrounding portion 12 of the accommodating cavity 11 is a single-layer structure made of a flexible material. When the accommodating cavity 1 is rotated to a sitting state relative to the seat assembly 3 on the vertical plane, a side of the circumferential surrounding portion 12 reaching a topmost point is a first side portion 121 of the circumferential surrounding portion 12, and a side of the circumferential surrounding portion 12 opposite to the first side portion 121 is a second side portion 122 of the circumferential surrounding portion 12.

The bearing portion 11 of the accommodating cavity 11 includes a double-layer flexible outer sleeve, and three rigid plates are wrapped in the double-layer flexible outer sleeve. In particular, the hard plate relatively close to the first side portion 121 forms a first portion 111, the rigid plate relatively far away from the first side portion 121 forms a second portion 112, and a lateral dimension of the second portion 112 matches a lateral dimension of the seat assembly 3. A third portion 113 is located between the second portion 112 and the second side portion 122 and is foldable in the lateral direction with the second portion 112. The second portion 112 and the third portion 113 are separate bodies, and the second portion 112 and the first portion 111 are integrally connected by a hinge. The bearing portion 11 is disposed on the seat assembly 3 in a movable manner on the seat assembly 3. A bottom surface of the second portion 112 of the bearing portion 11 is provided with a guide sleeve 114 disposed along the longitudinal direction. The guide sleeve 114 is a flexible guide sleeve made of a woven material. The guide sleeve 114 covers the seat assembly 3 and is movable longitudinally relative to the seat assembly 3. The bearing portion 11 is movable on the seat assembly 3 via the guide sleeve 114.

The two adjusting straps 2 are symmetrically disposed with a longitudinal axis of the accommodating cavity 1 as a center. The connection method of each of the adjusting straps 2 is as follows. Each of the adjusting straps 2 is located outside the circumferential surrounding portion 12 and is worn in the middle of the double-layer bearing portion 11, and one end of each of the adjusting straps 2 is fixed on the seat assembly 3 and another end of each of the adjusting straps 2 is fixed to the first side portion 121 near the opening.

Preferably, each of the adjusting straps 2 is closely adhered to an outer surface of an inner layer of the bearing portion 11 and an outer surface of the circumferential surrounding portion when the accommodating cavity 1 is in the lying state (for clarity, in the embodiments shown in the figures, the adjusting straps 2 are closely adhered to the outer surface of an outer layer of the bearing portion 11). Each of the adjusting straps 2 is tensioned by the seat assembly 3 and the first side portion 121 when the accommodating cavity 1 is in the sitting state. The second portion 112 is moved to a position supported by the seat assembly 3 during the rotation of the accommodating cavity 1 to the sitting state to form a seat portion, and the first portion 111 is supported by the tensioned adjusting straps 2 when the accommodating cavity 1 is rotated to the sitting state to form a backrest portion at a folding angle to the second portion 112.

The locking device is disposed on the frame 13, and two locking positions are provided between the locking device and the frame 13, wherein the first locking position corresponds to a position when the frame 13 is rotated to the sitting state, and the second locking position corresponds to a position when the frame 13 is rotated to the lying state.

Figure 14:
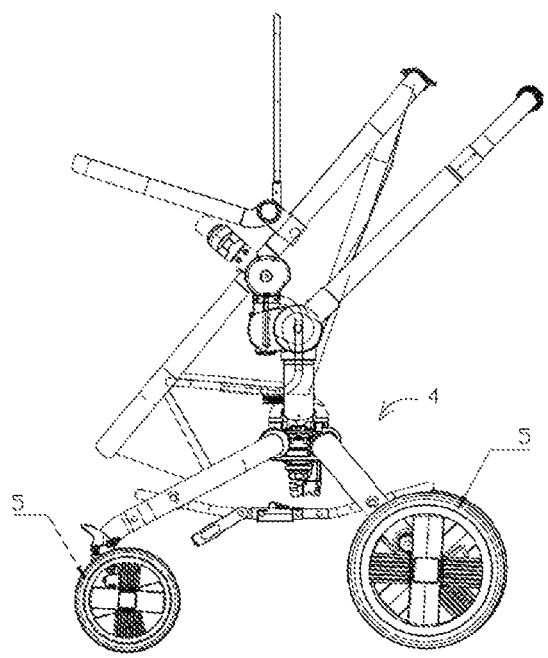
FIG. 14 is a structural diagram of a stroller of Embodiment 1 of the invention, wherein the accommodation device is in the sitting state, and the guardrail and the canopy are disposed on the frame.
Figure 15:
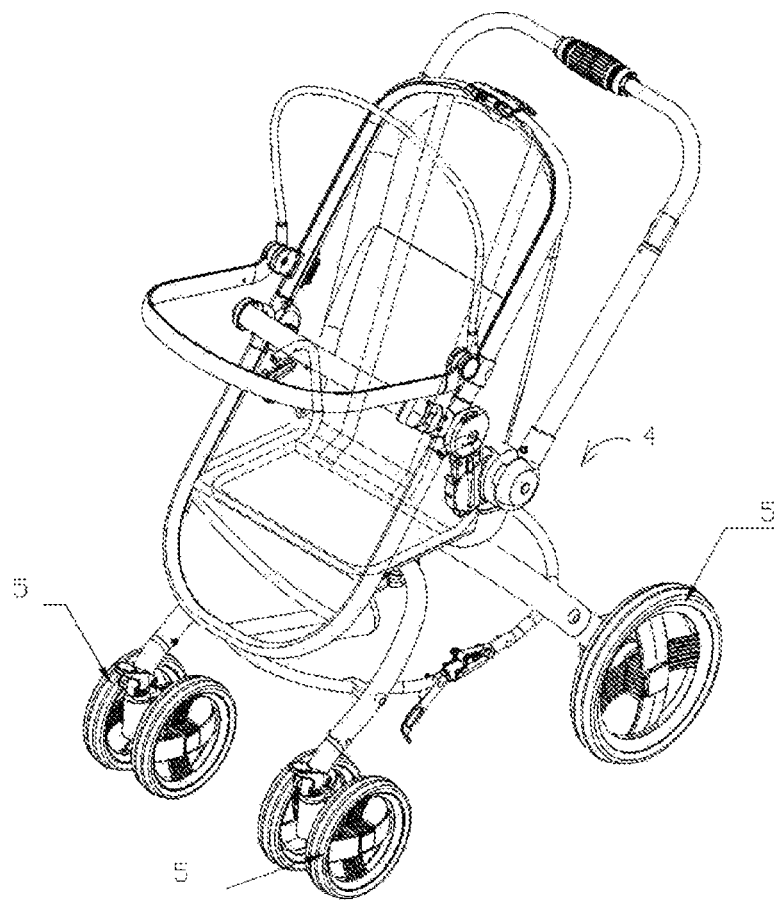
FIG. 15 is another structural diagram of the stroller of Embodiment 1 of the invention, wherein an accommodation device is in the sitting state, and the guardrail and the canopy are disposed on the frame.
Figure 16:
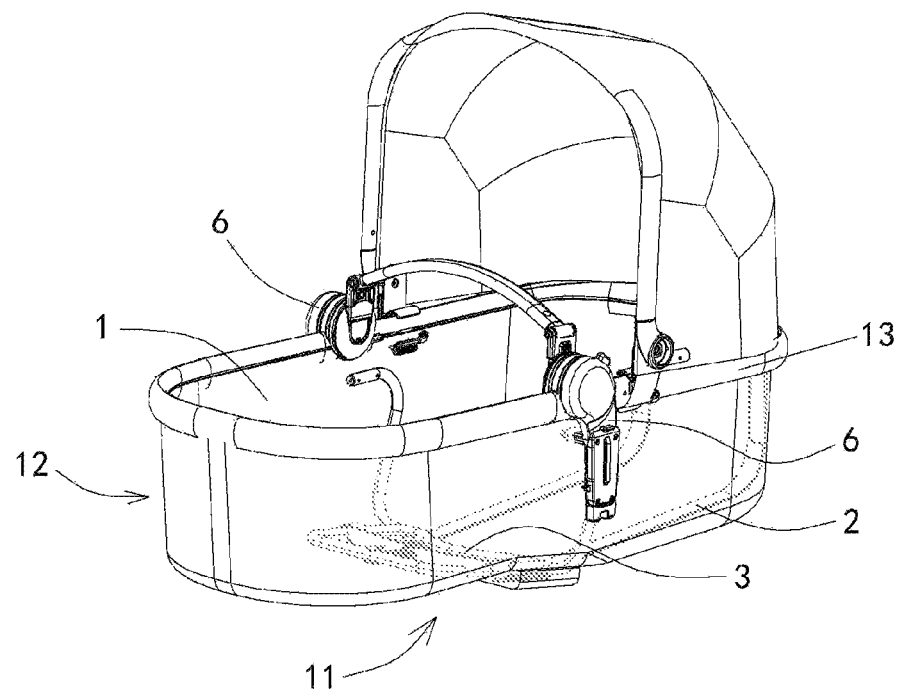
FIG. 16 is a perspective view of the overall structure of an accommodation device in a lying state of Embodiment 2 of the invention, wherein a guardrail, a handrail, and a canopy are disposed on a frame.
Figure 17:
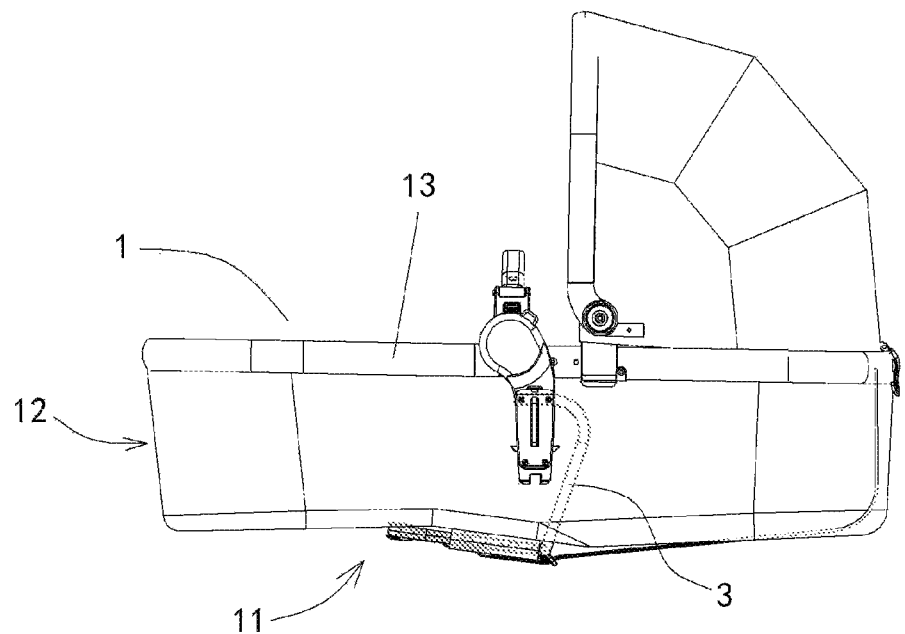
FIG. 17 is a front view of FIG. 16.
Figure 18:
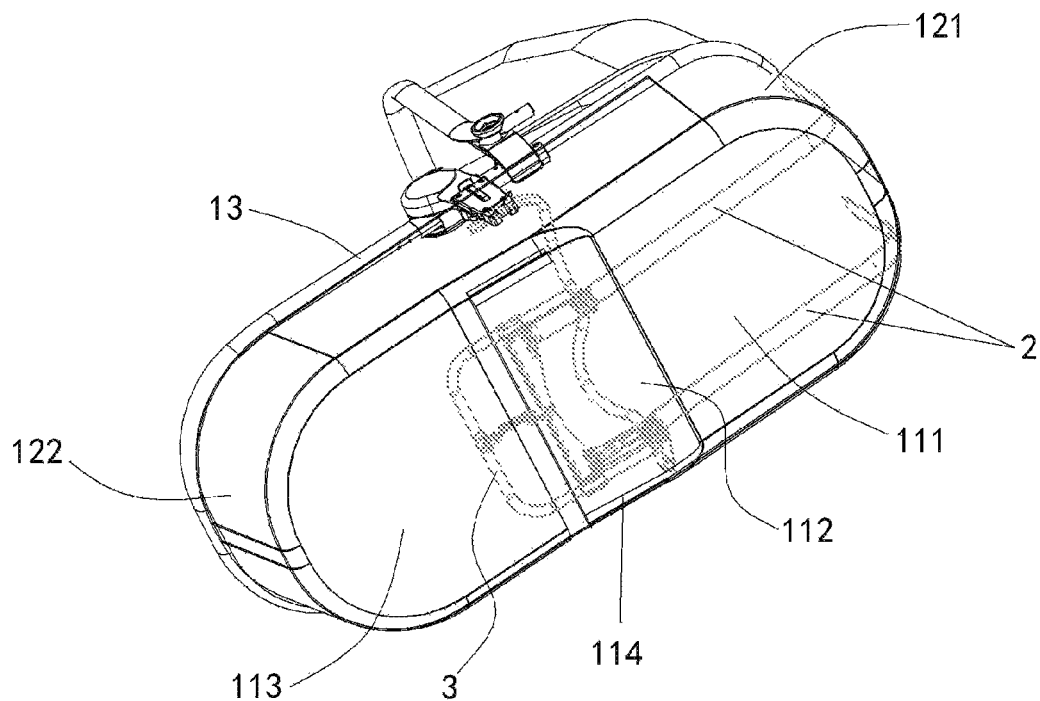
FIG. 18 is a structural diagram of a bottom part of FIG. 16.
Figure 19:
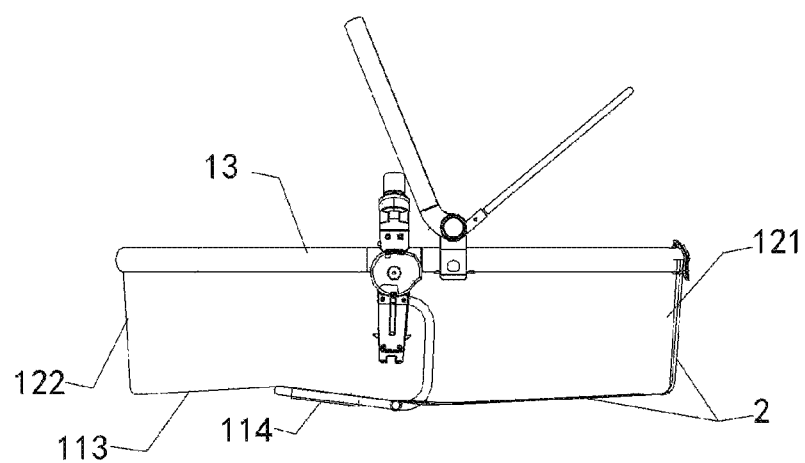
FIG. 19 is a front view of an accommodation device in the lying state of Embodiment 2 of the invention, wherein the guardrail and the canopy are disposed on the frame.
Figure 20:
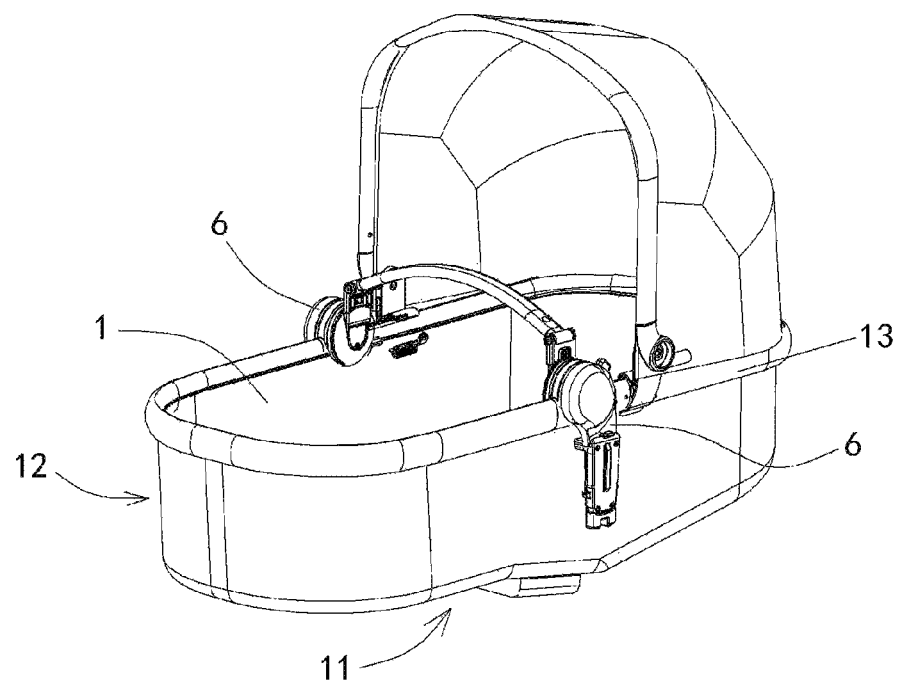
FIG. 20 is a 3D view of the overall structure of an accommodation device in the lying state of Embodiment 2 of the invention, wherein a guardrail, a handrail, and a canopy are disposed on a frame.
Figure 21:
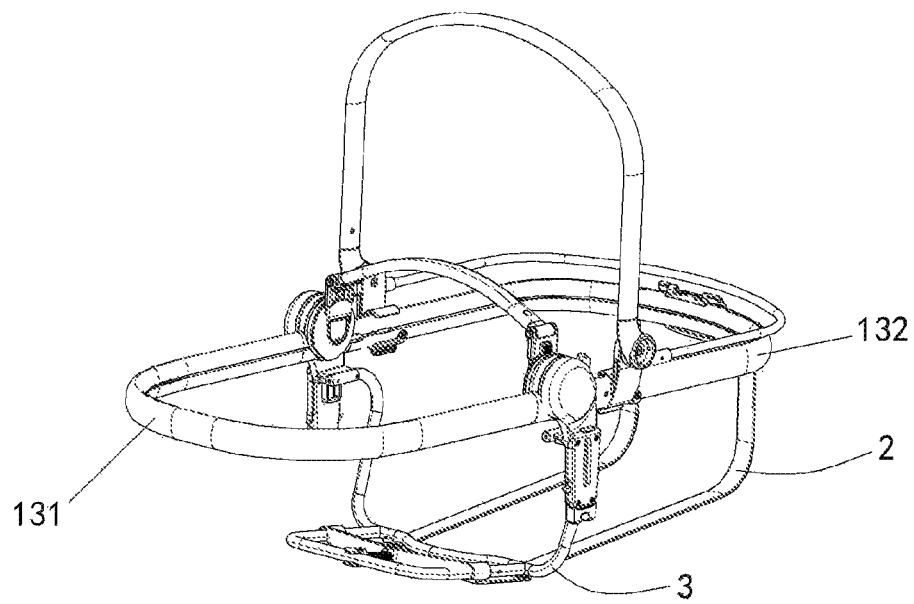
FIG. 21 is a diagram of the structure of FIG. 20 after a circumferential surrounding portion and the canopy are removed.
Figure 22:
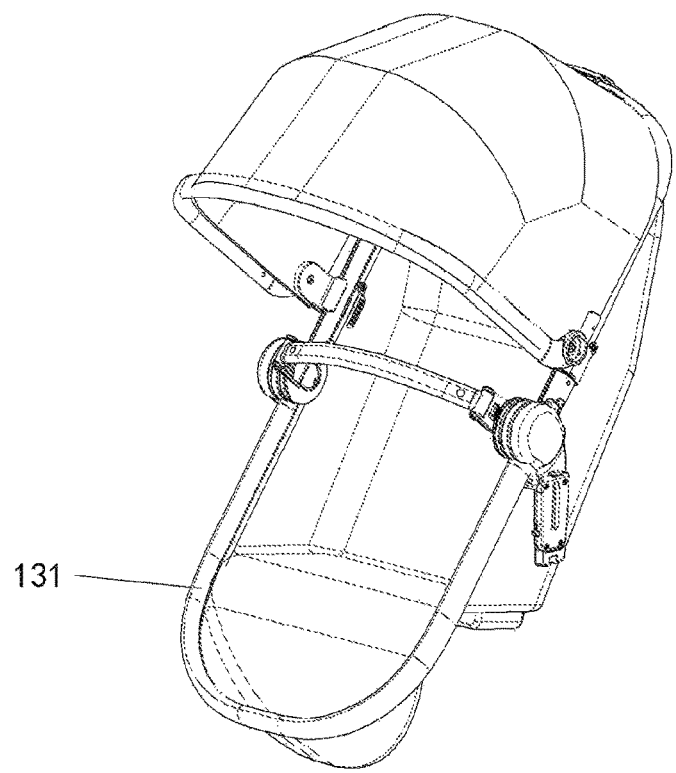
FIG. 22 is a 3D view of the overall structure of the accommodation device in a sitting state of Embodiment 2 of the invention, wherein the guardrail, the handrail, and the canopy are disposed on the frame.
Figure 23:
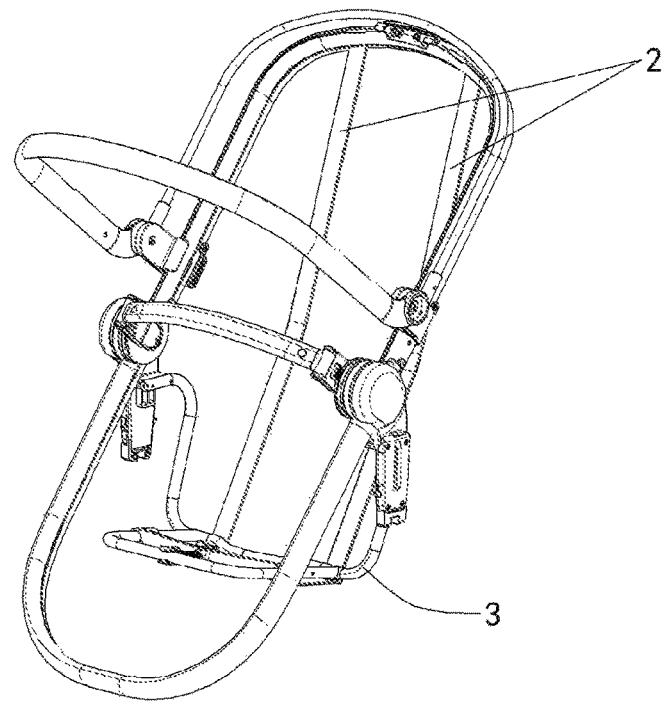
FIG. 23 is a diagram of the structure of FIG. 22 after the circumferential surrounding portion and the canopy are removed.
Figure 24:
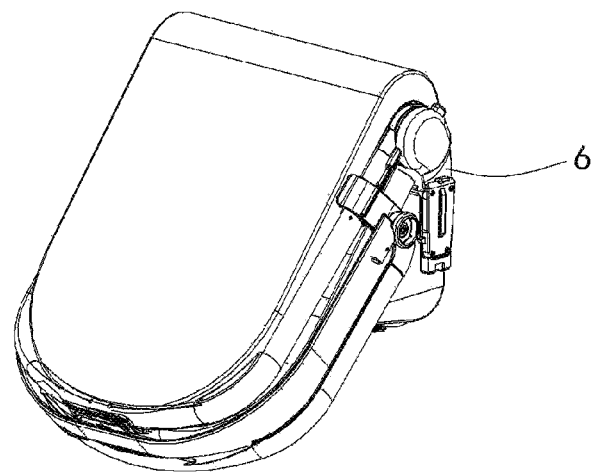
FIG. 24 is a 3D view of the overall structure of an accommodation device in a collapsed state of Embodiment 2 of the invention, wherein the guardrail, the handrail, and the canopy are disposed on the frame.
Figure 25:
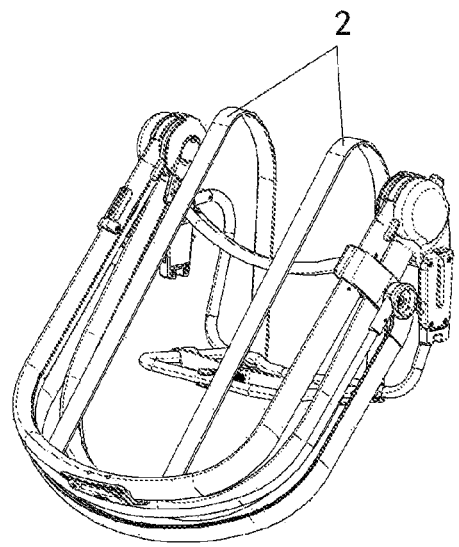
FIG. 25 is a diagram of the structure of FIG. 24 after the circumferential surrounding portion and the canopy are removed.
Figure 26:
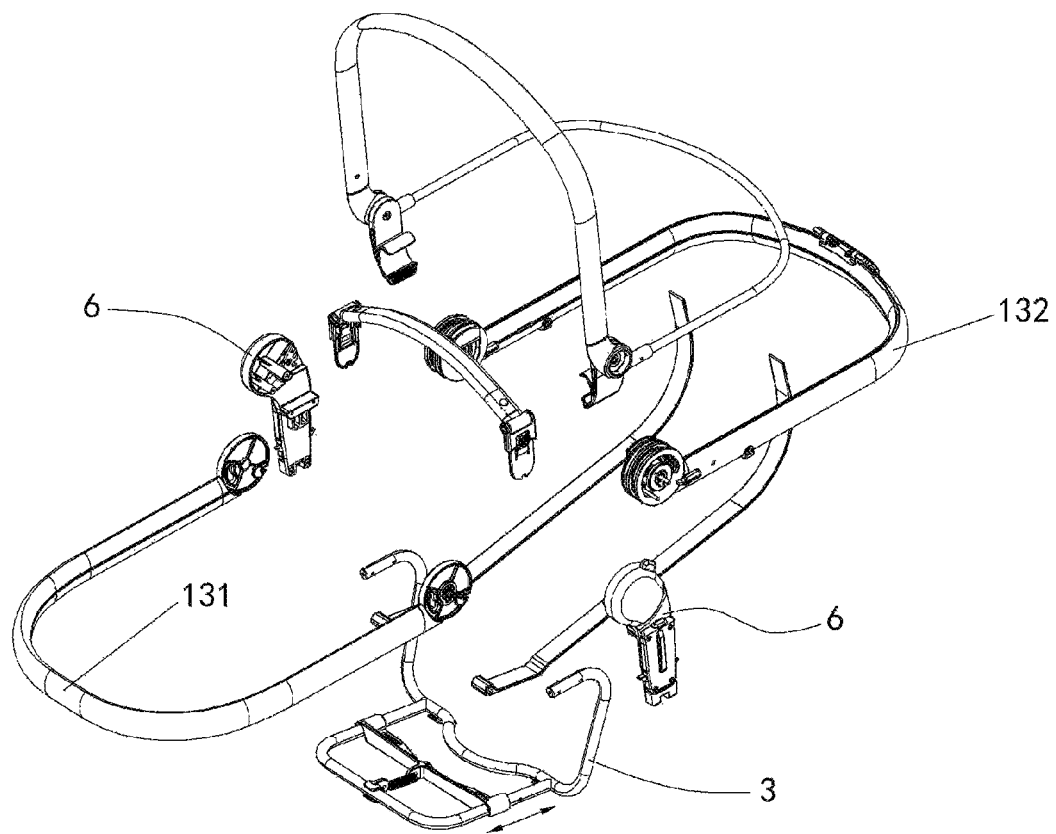
FIG. 26 is an exploded view of an accommodation device of Embodiment 2 of the invention.
Figure 27:
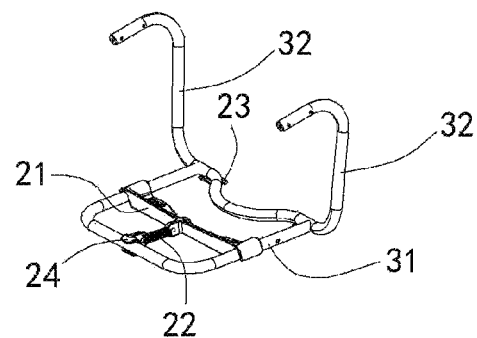
FIG. 27 is a diagram of a connection structure of a seat assembly, a seat sliding block, and a tension spring in Embodiment 2 of an accommodation device of the invention.
Figure 28:
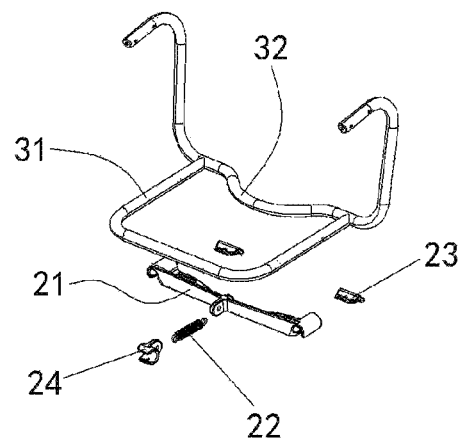
FIG. 28 is an exploded view of FIG. 27.
Figure 29:
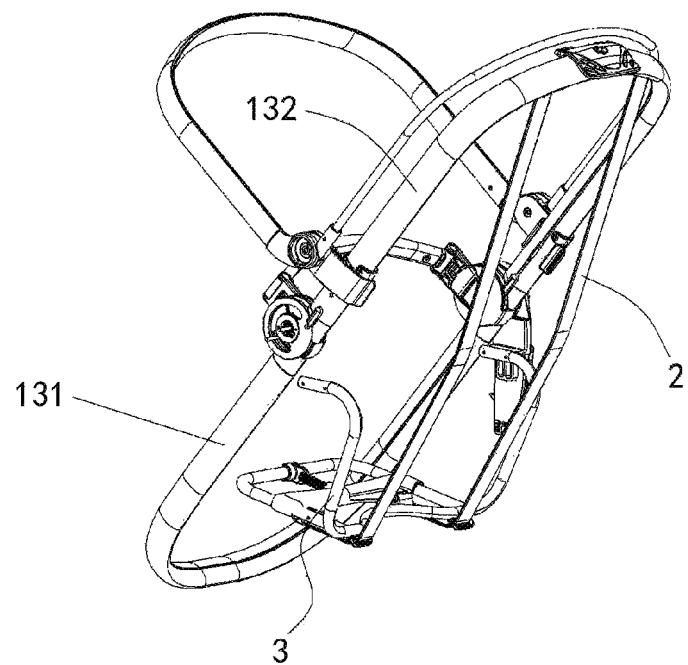
FIG. 29 is a 3D structural diagram of Embodiment 2 of the accommodation device of the invention in the sitting state, wherein a front frame body and a rear frame body are in a straight line.
Figure 30:
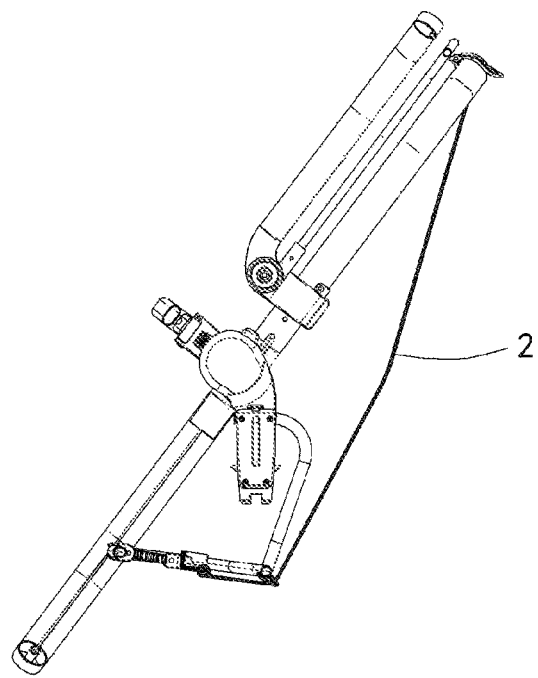
FIG. 30 is a cross-sectional diagram of Embodiment 2 of the accommodation device of the invention in the sitting state, wherein the front frame body and the rear frame body are in a straight line.
Figure 31:
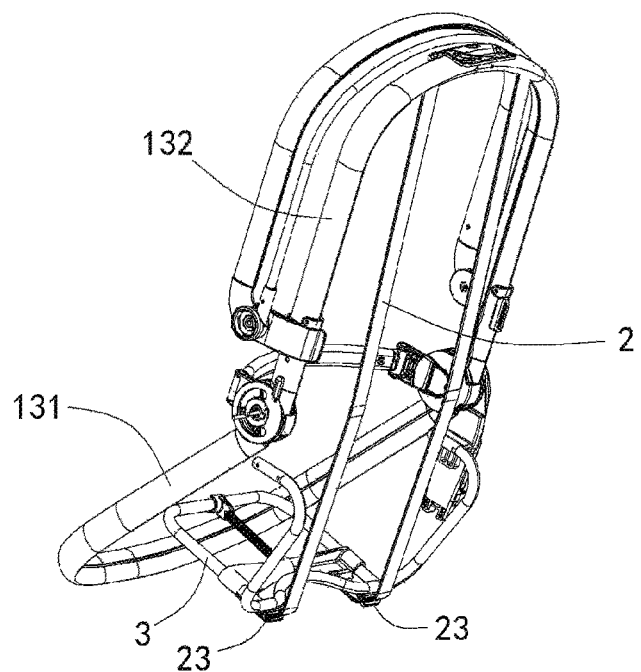
FIG. 31 is a 3D structural diagram of Embodiment 2 of the accommodation device of the invention in the sitting state, wherein there is an angle between the front frame body and the rear frame body.
Figure 32:
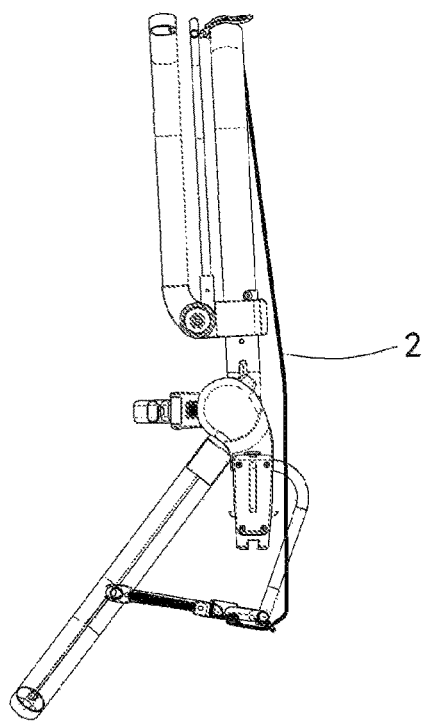
FIG. 32 is a cross-sectional diagram of Embodiment 2 of the accommodation device of the invention in the sitting state, wherein there is the angle between the front frame body and the rear frame body.

The strollers shown in FIGS. 14 to 15 include the above accommodation device and a chassis 4 with a wheel assembly 5, and the seat assembly 3 of the accommodation device is fixedly mounted on the chassis 4. The wheel assembly 5 is mounted at a bottom portion of the chassis 4 and is used to support the entire stroller.

When the accommodation device needs to be converted from the lying state to the sitting state, a user only needs to gradually lift the first side portion 121 of the circumferential surrounding portion 12 of the accommodating cavity 1 of the accommodation device to rotate relative to the seat assembly 3 on the vertical plane. During the lifting process, the seat assembly 3 is fixed and does not move, and an angle of the accommodating cavity 1 relative to the seat assembly 3 is gradually changed (comparing FIG. 4 and FIG. 10), so that the second portion 112 of the bearing portion 11 of the accommodating cavity 1 is pulled and correspondingly moved laterally relative to the seat assembly 3. In this process, the first portion 111 for forming the backrest portion and the second portion 112 for forming the seat portion are always tightly connected, and a distance between the first side portion 121 of the circumferential surrounding portion 12 of the accommodating cavity 1 and the seat assembly 3 is also gradually increased, so that the flexible adjusting straps 2 are gradually tensioned into a straight line (refer to FIG. 11). At the same time, the second side portion 112 of the circumferential surrounding portion 12 is rotated downward and pulls the third portion 113 of the bearing portion 11 downward. The lateral movement of the second portion 112 of the bearing portion 11 and the downward rotation of the third portion are synchronized, so that a folding angle is formed between the second portion 112 and the third portion 113, and the folding angle matches the seat assembly 3 when the accommodating cavity 1 is converted into the sitting state.

When the accommodating cavity reaches the sitting state, the second portion 112 of the bearing portion 11 is located just above the seat assembly 3 and is supported by the seat assembly 3 to form a seat portion for an infant or child, and a space for accommodating the feet of an infant or child is formed between the third portion 113 and the second side portion 122. At the same time, the flexible adjusting straps 2 are in a fully tensioned state, and since both ends of the adjusting straps 2 are respectively fixed at the seat assembly 3 and the opening of the first side portion 121 of the circumferential surrounding portion 12 of the accommodating cavity 1 (below the opening is referred to as a top connection point), the adjusting straps 2 may automatically support the first portion 111 of the bearing portion 11 at a position of a connecting line connected at the seat assembly 3 and the top connection point when tensioned, so as to form the backrest portion having a smaller folding angle (i.e., the angle of inclination with the vertical plane is smaller) at the second portion 112.

When the accommodation device needs to be converted from the sitting state to the lying state, the user only needs to gradually press the first side portion 121 of the circumferential surrounding portion 12 of the accommodation device 1 to rotate relative to the seat assembly 3 on the vertical plane. During the pressing process, the distance between the first side portion 121 of the circumferential surrounding portion 121 of the accommodation device 1 and the seat assembly 3 is gradually decreased to return to a relaxed state. At this time, the bearing portion 11 of the accommodation device 1 without support sags under its own gravity, and automatically returns to the lying state held by the circumferential surrounding portion 12.

Embodiment 2

Embodiment 2 of an accommodation device of the invention is shown in FIG. 16 to FIG. 32 and includes an accommodating cavity 1, a seat assembly 3, a locking device, and two adjusting straps 2. The adjusting straps 2 are woven straps, and the accommodating cavity 1 may be rotated relative to the seat assembly 3 on the vertical plane to be converted between a lying state, a sitting state, and a collapsed state.

In particular, the accommodating cavity 1 includes a bearing portion 11 and a flexible circumferential surrounding portion 12 having two opposite ends that are open ports. A lower open port of the circumferential surrounding portion 12 is covered by the bearing portion 11, and an upper open port forms an opening of the accommodating cavity 1 communicating with outside. A rigid frame 13 is provided around a periphery of the opening of the accommodating cavity 1, and the accommodating cavity 1 is rotatably connected to the seat assembly 3 via the frame 13.

The frame 13 is a split structure, including a front frame body 131 and a rear frame body 132 that are connected by a hinge. The front frame body 131 and the rear frame body 132 are both rigid frames, and the seat assembly 3 and a clamp assembly 6 are fixedly connected. Hinge axes of the front frame body 131 and of the rear frame body 132 are both disposed in the clamp assembly 6, and the front frame body 131 and the rear frame body 132 are both hinged with the seat assembly 3 via the clamp assembly 6 to drive the front frame body 131 and the rear frame 132 to be rotated around the hinge axes under the action of an external force. The front frame body 131 and the rear frame body 132 are substantially in a straight line when in the sitting state and the lying state. The frame 13 of the Embodiment 1 has the same structure as the frame 13 of the Embodiment 2.

The circumferential surrounding portion 12 of the accommodating cavity 11 is a single-layer structure made of a flexible material. When the accommodating cavity 1 is rotated to the sitting state relative to the seat assembly 3 on the vertical plane, a side of the circumferential surrounding portion 12 reaching a topmost point is the first side portion 121 of the circumferential surrounding portion 12, and a side of the circumferential surrounding portion 12 opposite to the first side 121 is a second side portion 122 of the circumferential surrounding portion 12.

The bearing portion 11 of the accommodating cavity 11 includes a double-layer flexible outer sleeve, and three rigid plates are wrapped in the double-layer flexible outer sleeve. In particular, the hard plate relatively close to the first side portion 121 forms the first portion 111, the rigid plate relatively far away from the first side portion 121 forms the second portion 112, and a lateral dimension of the second portion 112 is adapted to a lateral dimension of the seat assembly 3. A third portion 113 is located between the second portion 112 and the second side portion 122 and is foldable in the lateral direction with the second portion 112. The second portion 112 and the third portion 113 are separate bodies, and the second portion 112 and the first portion 111 are integrally connected by a hinge. The bearing portion 11 is disposed on the seat assembly in a movable manner on the seat assembly 3. A bottom surface of the second portion 112 of the bearing portion 11 is provided with a guide sleeve 114 disposed along the longitudinal direction. The guide sleeve 114 is a flexible guide sleeve made of a woven material. The guide sleeve 114 covers the seat assembly 3 and is movable longitudinally relative to the seat assembly 3. The bearing portion 11 is movable on the seat assembly 3 via the guide sleeve 114.

The two adjusting straps 2 are symmetrically disposed with the longitudinal axis of the accommodating cavity 1 as the center. The connection method of each of the adjusting straps 2 is as follows. Each of the adjusting straps 2 is located outside the circumferential surrounding portion 12 and is worn in the middle of the double-layer bearing portion 11, and the first end of each of the adjusting straps 2 is connected to the seat assembly 3, the second end thereof is fixed to the opening of the first side portion 121, and the adjusting straps 2 are tensioned by the seat assembly 3 and the first side portion 121 when the accommodating cavity 1 is in the sitting state. The first end of the adjusting straps 2 is movable along the seat assembly 3 away from or close to the second end of the adjusting straps 2, and the front frame body 131 and the rear frame body 132 pull the adjusting straps 2 to be moved closer to the second end thereof when the two are collapsed from substantially a linear state to a stacked state.

Preferably, each of the adjusting straps 2 is better closely adhered to the outer surface of the inner layer of the bearing portion 11 and the outer surface of the circumferential surrounding portion when the accommodating cavity 1 is in the lying state (for clarity, in the embodiments shown in the figures, the adjusting straps 2 are closely adhered to the outer surface of the outer layer of the bearing portion 11). Each of the adjusting straps 2 is tensioned by the seat assembly 3 and the first side portion 121 when the accommodating cavity 1 is in the sitting state, and when the accommodating cavity 1 is in a folded state, the first end of the adjusting straps 2 may be moved in a direction close to the second end of the adjusting straps 2 relative to the seat assembly 3, so that a length of the adjusting straps 2 may meet the collapsing requirement of the accommodating cavity 1 on the vertical plane, so that the accommodation device has a plurality of states. The second portion 112 is moved to a position supported by the seat assembly 3 during the process of the accommodation cavity 1 converting from the lying state to the sitting state to form a seat portion, and the first portion 111 is supported by the tensioned adjusting straps 2 when the accommodating cavity 1 is converted to the sitting state to form a backrest portion at a folding angle to the second portion 112.

In the present embodiment, the seat assembly 3 has a seat bottom tube 31 and a seat upper tube 32 connected to each other. The seat bottom tube 31 is a U-shaped tube. The seat upper tube 32 is fixedly connected to an open end of the U-shaped tube. One end of the adjusting straps 2 connected to the seat assembly 3 is connected to a tension spring 22 via a seat sliding block 21. Two ends of the seat sliding block 21 are sleeved on side tubes on both sides of the U-shaped tube. An end of the tension spring 22 is fixedly connected to the seat sliding block 21, and the other end of the tension spring 22 is fixedly connected to a bottom tube at a bottom part of the U-shaped tube to provide a restoring force when the seat sliding block 21 is reset. The seat sliding block 21 is movable longitudinally along the seat bottom tube 31 under the action of an external force, which is equivalent to seemingly increasing the length of the adjusting straps 2. Moreover, after the external force is eliminated, the seat sliding block 21 is reset via the tension spring 22, the guide sleeve 114 surrounds and covers the seat bottom tube 31, the seat sliding block 21, and the tension spring 22, and is movable longitudinally along the seat bottom tube 31. The guide sleeve 114 is sleeved on the seat bottom tube 31 and the seat sliding block 21, so the guide sleeve 114 and the seat sliding block 21 do not interfere with each other when moving longitudinally along the seat bottom tube 31.

In order to facilitate the assembly of the tension spring 22 and the U-shaped tube, an end of the tension spring 22 connected to the bottom tube at the bottom of the U-shaped tube has a tension spring fixing seat 24. The tension spring fixing seat 24 has pliers and is directly clamped on the U-shaped tube via the pliers during assembly to facilitate assembly. The seat upper tube 32 is also provided with an adjusting strap sleeve 23 at a position intersected with the seat bottom tube 31. There are two adjusting belt sleeves 23 that are arranged symmetrically in the vertical direction. The adjusting belt sleeves 23 are provided with a through hole for the adjusting straps 2 passing therethrough. One adjusting strap 2 passes through the through hole of one adjusting band sleeve 23. The adjusting belt sleeves 23 make the adjusting straps 2 to always be in frictional contact with the seat bottom tube 31 during sliding of the adjusting strap 2. The additional adjusting strap sleeves 23 may be supported by a suitable material different from the U-shaped tube, such as a plastic material, to minimize the wear of the adjusting straps 2. At the same time, the arrangement position of the adjusting belt sleeve 23 is close to the tension spring 22 to ensure that a stretching direction of the adjusting straps 2 to the tension spring 22 coincides with an axis of the tension spring 22 itself when the accommodation device is collapsed to prevent tension deviation.

The locking device is disposed on the frame 13, and three locking positions are provided between the locking device and the frame 13, wherein the first locking position corresponds to the position when the frame 13 is rotated to the sitting state, the second locking position corresponds to the position when the frame 13 is rotated to the lying state, and the third locking position corresponds to the position when the frame 13 is rotated to the collapsed state.

Figure 33:
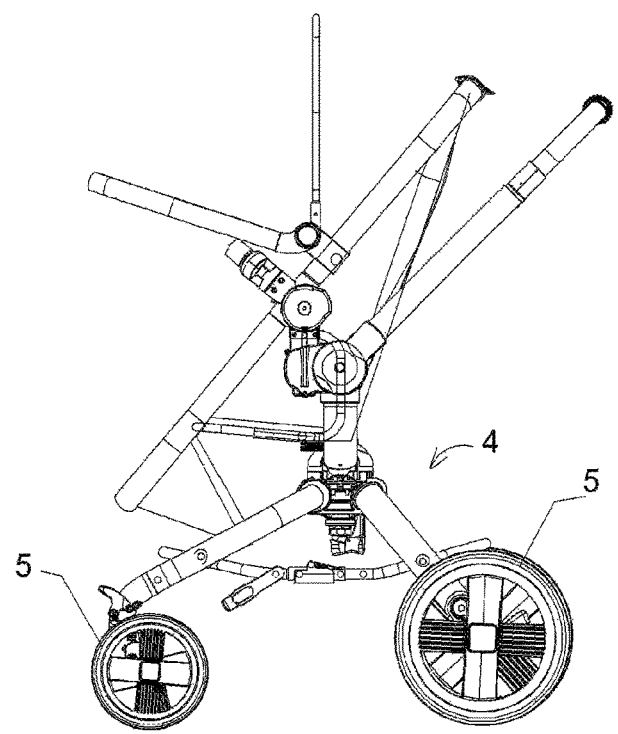
FIG. 33 is a structural diagram of a stroller of Embodiment 2 of the invention, wherein the accommodation device is in the sitting state, and the guardrail and the canopy are disposed on the frame.
Figure 34:
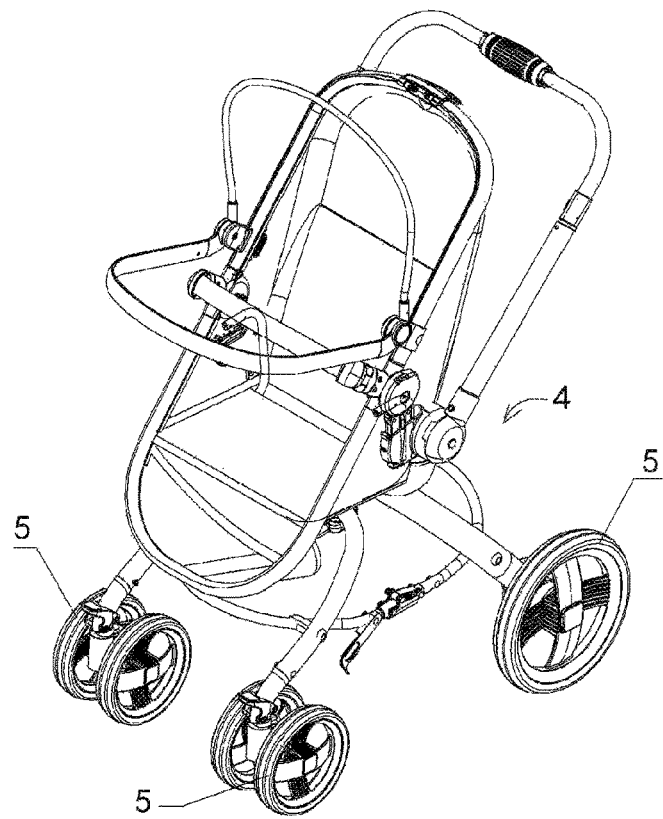
FIG. 34 is another structural diagram of a stroller of Embodiment 2 of the invention, wherein the accommodation device is in the sitting state, and the guardrail and the canopy are disposed on the frame.

The strollers shown in FIGS. 33 to 34 include the above accommodation device and the chassis 4 with the wheel assembly 5, and the seat assembly 3 of the accommodation device is fixedly mounted on the chassis 4. The wheel assembly 5 is mounted at a bottom portion of the chassis 4 and is used to support the entire stroller.

When the accommodation device needs to be converted from the lying state to the sitting state, the user only needs to gradually lift the first side portion 121 of the circumferential surrounding portion 12 of the accommodating cavity 1 of the accommodation device to rotate relative to the seat assembly 3 on the vertical plane. During the lifting process, the seat assembly 3 is fixed and does not move, and an angle of the accommodating cavity 1 relative to the seat assembly 3 is gradually changed, so that the second portion 112 of the bearing portion 11 of the accommodating cavity 1 is pulled and adaptively moved laterally relative to the seat assembly 3. In this process, the first portion 111 for forming the backrest portion and the second portion 112 for forming the seat portion are always tightly connected, and the distance between the first side portion 121 of the circumferential surrounding portion 12 of the accommodating cavity 1 and the seat assembly 3 is also gradually increased, so that the flexible adjusting straps 2 are gradually tensioned into a straight line. At the same time, the second side portion 112 of the circumferential surrounding portion 12 is rotated downward and pulls the third portion 113 of the bearing portion 11 downward. The lateral movement of the second portion 112 of the bearing portion 11 and the downward rotation of the third portion are synchronized, so that a folding angle is formed between the second portion 112 and the third portion 113, and the folding angle is adapted to the seat assembly 3 when the accommodating cavity 1 is converted into the sitting state.

When the accommodating cavity reaches the sitting state, the second portion 112 of the bearing portion 11 is located just above the seat assembly 3 and is supported by the seat assembly 3 to form a seat portion for an infant or child, and a space for accommodating the feet of an infant or child is formed between the third portion 13 and the second side portion 122. At the same time, the flexible adjusting straps 2 are in a fully tensioned state, and since both ends of the adjusting straps 2 are respectively fixed at the seat assembly 3 and the opening of the first side portion 121 of the circumferential surrounding portion 12 of the accommodating cavity 1 (below the opening is referred to as a top connection point), the adjusting straps 2 may automatically support the first portion 111 of the bearing portion 11 at a position of the connecting line connected at the seat assembly 3 and the top connection point when tensioned, so as to form a backrest portion having a smaller folding angle (i.e., the angle of inclination with the vertical plane is smaller) at the second portion 112.

When the accommodation device needs to be converted from the sitting state to the collapsed state, the front frame body 131 and the seat assembly 3 are kept stationary, and only the rear frame body 132 needs to be rotated around a hinge axis toward the direction of adhering to the front frame body 131, and the rear frame body 132 pulls the adjusting straps 2 during the rotation process. Since the adjusting straps 2 are connected to the seat assembly 3 via the seat sliding block 21 and the tension spring 22, the adjusting straps 2 are in a full tension state, and the adjusting straps 2 drive the seat sliding block 21 to be moved longitudinally along the seat bottom tube 31. Since the length of the adjusting straps 2 is strictly designed according to the lying state and the sitting state of the accommodation device, the length is unchanged under the action of an external force. Therefore, the adjusting straps 2 of the invention are designed to be able to slide relative to the seat assembly 3 when the accommodating cavity 1 is in the collapsed state, which is equivalent to seemingly increasing the length of the adjusting straps 2, so that the adjusting straps 2 may meet the collapsing requirement of the accommodation device by sliding relative to the seat assembly 3 when the length of the adjusting straps 2 remains unchanged to solve the issue of length limit of the adjusting straps 2. That is, the adjusting straps 2 not only satisfy the conversion between the sitting state and the standing state of the accommodation device, but also add a collapsing function to the accommodation device on the basis of sitting and lying. During the movement of the seat sliding block 21, the tension spring 22 is elongated, elastic potential energy is accumulated, and after the collapsing of the accommodation device is completed, the accommodation device is locked by the locking device. When the accommodation device needs to be converted from the collapsed state to the sitting state, the user only needs to unlock the locking device and reversely rotate the rear frame body 132 to return the rear frame body 132 to the sitting state. The adjusting straps 2 are returned from the full tension state to the relaxed state, the tension spring 22 is elastically returned to the original state after the external force is eliminated, and the seat sliding block 21 and the adjusting straps 2 are pulled back to the state before being pulled.

When the accommodation device needs to be converted from the sitting state to the lying state, the user only needs to gradually press the first side portion 121 of the circumferential surrounding portion 12 of the accommodation device 1 to rotate relative to the seat assembly 3 on the vertical plane. During the pressing process, the distance between the first side portion 121 of the circumferential surrounding portion 121 of the accommodation device 1 and the seat assembly 3 is gradually decreased to return to the relaxed state. At this time, the bearing portion 11 of the accommodation device 1 without support sags under its own gravity, and automatically returns to the lying state held by the circumferential surrounding portion 12.

What is claimed is:

1. An accommodation device adapted for a stroller, the accommodation device comprising a seat assembly and an accommodating cavity, wherein the accommodating cavity comprises a bearing portion and a flexible circumferential surrounding portion having upper and lower ends that are both open ports, a lower open port of the circumferential surrounding portion is covered by the bearing portion, and an upper open port of the circumferential surrounding portion forms an opening of the accommodating cavity communicating with outside, the accommodating cavity is rotatable relative to the seat assembly on a vertical plane to be converted between a lying state and a sitting state, when the accommodating cavity is rotated to the sitting state, a side of the circumferential surrounding portion reaching a highest point is a first side portion of the circumferential surrounding portion, and a side of the circumferential surrounding portion opposite to the first side portion is a second side portion of the circumferential surrounding portion, the bearing portion is movably disposed on the seat assembly, at least two portions of the bearing portion are foldable in a lateral direction to form a first portion relatively close to the first side portion and a second portion relatively far from the first side portion, the accommodation device further comprises at least one flexible adjusting strap, a first end of the adjusting strap is connected to the seat assembly, a second end of the adjusting strap is fixed to an opening of the first side portion, and the adjusting strap is tensioned by the seat assembly and the first side portion when the accommodating cavity is in the sitting state, the second portion is moved to a position supported by the seat assembly to form a seat portion during rotation of the accommodation cavity from the lying state to the sitting state, and the first portion is supported by the tensioned adjusting strap when the accommodating cavity is rotated to the sitting state to form a backrest portion at a folding angle to the second portion.

2. The accommodation device of claim 1, wherein a frame is provided around a periphery of the opening of the accommodating cavity, and the frame comprises a front frame body and a rear frame body forming a hinged connection, the front frame body and the rear frame body are substantially arranged in a straight line when in the sitting state and the lying state, and the first end of the adjusting strap is fixedly connected to the seat assembly.

3. The accommodation device of claim 2, wherein a bottom surface of the second portion of the bearing portion of the accommodating cavity is provided with a guide sleeve disposed in a longitudinal direction, and the guide sleeve is sleeved on the seat assembly and is movable relative to the seat assembly in the longitudinal direction.

4. The accommodation device of claim 1, wherein a frame is provided around a periphery of the opening of the accommodating cavity, the frame comprises a front frame body and a rear frame body forming a hinged connection, the front frame body and the rear frame body are substantially arranged in a straight line when in the sitting state and the lying state, the first end of the adjusting strap is movable along the seat assembly away from or close to the second end of the adjusting strap, and the front frame body and the rear frame body pull the adjusting strap to be moved in a direction close to the second end thereof when the front frame body and the rear frame body are collapsed to a stacked state from a substantially linear state.

5. The accommodation device of claim 4, wherein an end of the adjusting strap connected to the seat assembly is connected to a tension spring via a seat sliding block, the seat sliding block is sleeved on the seat assembly and is slidable longitudinally along the seat assembly, and the tension spring is respectively connected to the seat sliding block and the seat assembly to provide a restoring force when the seat sliding block is reset.

6. The accommodation device of claim 5, wherein a bottom surface of the second portion of the bearing portion of the accommodating cavity is provided with a guide sleeve disposed in a longitudinal direction, the guide sleeve is sleeved on the seat assembly and is movable relative to the seat assembly in the longitudinal direction, and the guide sleeve surrounds and covers the seat sliding block and the tension spring.

7. The accommodation device of claim 6, wherein the seat assembly has a seat bottom tube and a seat upper tube connected to each other, the seat bottom tube is a U-shaped tube, the seat upper tube is fixedly connected to an open end of the U-shaped tube, both ends of the seat sliding block are respectively sleeved on side tubes on both sides of the U-shaped tube, an end of the tension spring is fixedly connected to the seat sliding block, and the other end of the tension spring is fixedly connected to a bottom tube at a bottom part of the U-shaped tube, the seat sliding block is movable longitudinally along the seat bottom tube under an action of an external force to increase an effective length of the adjusting strap, and after the external force is eliminated, the seat sliding block is reset via the tension spring, and the guide sleeve surrounds and covers the seat bottom tube and is movable longitudinally along the seat bottom tube.

8. The accommodation device of claim 7, wherein the other end of the tension spring connected to the bottom tube at the bottom part of the U-shaped tube has a tension spring fixing seat, the tension spring fixing seat has pliers, and is directly clamped on the U-shaped tube via the pliers during assembly.

9. The accommodation device of claim 7, wherein the seat upper tube is provided with an adjusting strap sleeve at a position intersected with the seat bottom tube, the adjusting strap sleeve is provided with a through hole for the adjusting strap passing therethrough, and the adjusting strap sleeve makes the adjusting strap always be in frictional contact with the seat bottom tube during sliding of the adjusting strap.

10. The accommodation device of claim 1, wherein the bearing portion and/or the circumferential surrounding portion of the accommodating cavity is one layer or more than one layer, the adjusting strap is located outside an innermost layer of the bearing portion and/or the circumferential surrounding portion, and when the accommodating cavity is in the lying state, the adjusting strap is closely adhered to an outer surface of the innermost layer of the bearing portion and/or the circumferential surrounding portion, or is closely adhered to an outer surface of any layer outside the innermost layer.

11. The accommodation device of claim 1, wherein the bearing portion of the accommodating cavity comprises a multi-layer outer sleeve that is flexible, at least two rigid plates that are foldable between each other are wrapped in the multi-layer outer sleeve, and the rigid plates relatively close to the first side portion form the first portion and the rigid plates relatively far from the first side portion form the second portion.

12. The accommodation device of claim 11, wherein a third rigid plate is further wrapped in the multi-layer outer sleeve of the bearing portion, the third rigid plate is located between the second portion and the second side portion and is foldable with the second portion in a lateral direction, and a lateral dimension of the second portion matches a lateral dimension of the seat assembly.

13. The accommodation device of claim 12, wherein the second portion and the third portion are separate bodies, and the second portion and the first portion are integrally connected by a hinge.

14. The accommodation device of claim 4, wherein the front frame body and the rear frame body are both rigid frames, and the front frame body and the rear frame body are both hinged with the seat assembly via a clamp assembly.

15. The accommodation device of claim 14, wherein the accommodation device further comprises a locking device, the locking device is disposed on the frame, at least three locking positions are provided between the locking device and the frame, a first locking position corresponds to a position when the frame is rotated to the sitting state, a second locking position corresponds to a position when the frame is rotated to the lying state, and a third locking position corresponds to a position when the frame is rotated to a collapsed state.

16. A stroller, comprising a chassis with a wheel assembly, wherein the stroller further comprises the accommodation device of claim 1, the seat assembly of the accommodation device is fixedly mounted on the chassis, and the wheel assembly is mounted at a bottom portion of the chassis to support the entire stroller.

* * * * *